(12) United States Patent
Lv

(10) Patent No.: US 12,475,747 B2
(45) Date of Patent: Nov. 18, 2025

(54) CHARGING DOOR PROVIDED WITH PROJECTION LAMP AND METHOD OF CONTROLLING PROJECTION OF SAME

(71) Applicants: Hyundai Motor Company, Seoul (KR); Kia Corporation, Seoul (KR)

(72) Inventor: Kui Chao Lv, Yantai (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 400 days.

(21) Appl. No.: 18/075,097

(22) Filed: Dec. 5, 2022

(65) Prior Publication Data
US 2023/0177896 A1   Jun. 8, 2023

(30) Foreign Application Priority Data
Dec. 7, 2021   (CN) .......................... 202111485966.5

(51) Int. Cl.
*G07C 5/08*    (2006.01)
*B60K 15/05*   (2006.01)
*B60L 53/16*   (2019.01)
*B60L 58/12*   (2019.01)
*B60Q 3/30*    (2017.01)
*B60Q 3/80*    (2017.01)
*B60R 25/24*   (2013.01)
*H05B 47/105*  (2020.01)

(52) U.S. Cl.
CPC ............ *G07C 5/0825* (2013.01); *B60K 15/05* (2013.01); *B60L 53/16* (2019.02); *B60L 58/12* (2019.02); *B60Q 3/30* (2017.02); *B60Q 3/80* (2017.02); *B60R 25/245* (2013.01); *H05B 47/105* (2020.01)

(58) Field of Classification Search
CPC .......... G07C 5/0825; B60Q 3/80; B60Q 3/30; B60L 58/12; B60L 53/16; H05B 47/105; B60K 15/05; B60R 25/245
See application file for complete search history.

(56) References Cited

U.S. PATENT DOCUMENTS

| | | | |
|---|---|---|---|
| 2018/0334052 A1* | 11/2018 | Hwang | H02J 7/0044 |
| 2022/0051492 A1* | 2/2022 | Badger, II | B60Q 1/50 |
| 2022/0212595 A1* | 7/2022 | Alexanian | B60Q 1/2603 |
| 2022/0305924 A1* | 9/2022 | Kwak | B60L 53/16 |
| 2023/0103181 A1* | 3/2023 | Kim | H05B 47/20 340/425.5 |
| 2024/0075824 A1* | 3/2024 | Shibata | H01R 13/7172 |

* cited by examiner

*Primary Examiner* — Christopher E Dunay
(74) *Attorney, Agent, or Firm* — Morgan, Lewis & Bockius LLP

(57) ABSTRACT

A charging door provided with a projection lamp and a method of controlling projection of the same, includes a base, a charging door panel, a connection member, and a projection lamp module, wherein a charging port is formed in the base, and a vehicle is charged through the charging port, the charging door panel is pivotably mounted to the base, the connection member connects the base and the charging door panel with each other, and a mounting hole is formed in the connection member, and the projection lamp module is mounted in the mounting hole of the connection member, and the projection lamp module is electrically connected to a controller to be turned on or off according to a command signal of the controller and to project light of a predetermined color, based on a command signal of the controller.

15 Claims, 12 Drawing Sheets

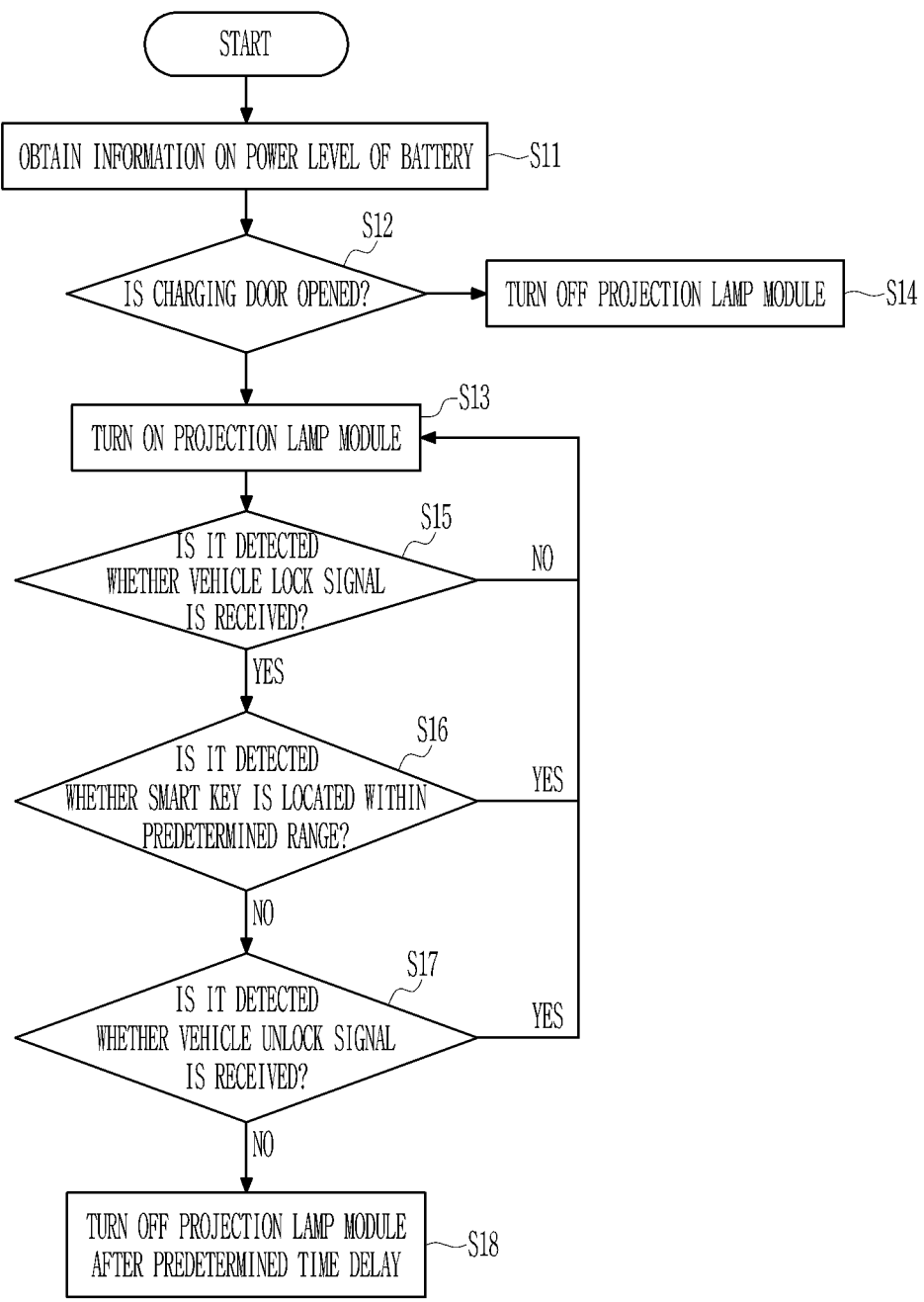

CHARGING DOOR PROVIDED WITH PROJECTION LAMP AND METHOD OF CONTROLLING PROJECTION OF SAME

CROSS-REFERENCE TO RELATED APPLICATION

The present application claims priority to and the benefit of Chinese Patent Application No. 202111485966.5 filed in the Chinese National Intellectual Property Administration on Dec. 7, 2021, the entire contents of which is incorporated herein for all purposes by this reference.

BACKGROUND OF THE PRESENT DISCLOSURE

Field of the Present Disclosure

The present disclosure relates to a technology field of vehicle electronic control, and more particularly, to a charging door provided with a projection lamp and a method of controlling projection of the same.

Description of Related Art

A charging door of a current electric vehicle may mainly include a charging door base and a charging door panel hinged to the charging door base, and a charging port into which a charging gun is inserted is mounted in the charging door base. Information on a state of charge (SOC) value of the electric vehicle may not be displayed on the charging door base when the electric vehicle is charged using the charging gun, and it is thus impossible for a vehicle user to intuitively determine whether the electric vehicle is currently being charged normally and the SOC value of a battery when charged.

Furthermore, although some vehicles may be provided with a charging indicator light, the charging indicator light may be usually provided in the charging door base. For example, the indicator light may be mounted around the charging port, and use an elongated semicircular light guide. This indicator light may have some disadvantages. First, it may be difficult to arrange parts of the vehicle because the indicator light occupies a lot of space in a limited space of the vehicle. Second, it may be difficult for the vehicle user to easily recognize the SOC value of the battery because the SOC value of the battery is almost invisible from a distance unless the vehicle user stands right in front of the charging door. Furthermore, at night or in dim light, there may be no bright light to illuminate the ground under the charging door, blocking a view of the vehicle user. Therefore, the charging gun may collide with the charging door base while inserting the charging gun into the charging port or the vehicle user may collide with the charging door panel during a vehicle charging process, which may often cause inconvenience to the vehicle user when charging the vehicle. Furthermore, the charging door provided with the charging indicator light may have only a function of indicating the SOC or a function of notifying a failure, but may not have a function of interacting with the vehicle user. This charging door may lack a sense of luxury.

Therefore, there is a demand for a charging door structure provided with a multifunctional projection lamp such as a lighting lamp function, an indicator light function, and a customer interactive welcome light function.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a charging door provided with a projection lamp and a method of controlling projection of the same, which may be convenient for a vehicle user to charge a vehicle at night or in dim light by allowing a projection lamp module to project various colors of light onto the ground under the charging door based on an obtained information on a state of charge (SOC) value of a battery.

Various aspects of the present disclosure are directed to providing a charging door provided with a projection lamp and a method of controlling projection of the same, which may allow a vehicle user to easily and clearly understand information on a current SOC from a distance through light of the various colors to indicate the information on the SOC value of the battery.

According to various exemplary embodiments of the present disclosure, a charging door provided with a projection lamp is provided. The charging door includes a base, a charging door panel, a connection member, and a projection lamp module, wherein a charging port is formed in the base, and a vehicle is charged through the charging port, the charging door panel is pivotably mounted to the base, the connection member is configured to connect the base and the charging door panel with each other, and a mounting hole is formed in the connection member, and the projection lamp module is mounted in the mounting hole of the connection member, the projection lamp module is electrically connected to a controller to be turned on or off according to a command signal of the controller and to project light of a predetermined color based on the command signal of the controller.

The projection lamp module may include: an upper cover mounted with a fixing member fixing the projection lamp module in the mounting hole of the connection member; a lower cover opposing the upper cover and including an accommodation space formed between the upper cover and the lower cover; a projection assembly provided in the accommodation space between the upper cover and the lower cover, and including an optical assembly, a film sheet, and a light emitting assembly integrated to each other; a transparent cover projecting light emitted from the projection assembly; and a wiring connector electrically connecting the projection lamp module to the controller.

The charging door panel may be mounted with a charging door panel-connection rib, the connection member may be mounted with a connection hook matched with the charging door panel-connection rib, the charging door panel may slide along a guide member of the connection member until the charging door panel-connection rib on the charging door panel is connected to the connection hook on the connection member after the projection lamp module is mounted in the mounting hole of the connection member, and the connection member may include a gooseneck hinge.

The charging door may further include a micro switch configured for detecting opening or closing of the charging door by being interlocked with the charging door panel, wherein the micro switch is electrically connected to the controller to transmit a detected signal indicating that the charging door is opened or closed to the controller, the micro switch is configured to transmit the signal indicating that the charging door is opened to the controller when the charging door panel is opened, and the micro switch is configured to transmit the signal indicating that the charging door is closed to the controller when the charging door panel is closed.

The controller is configured to obtain information on a state of charge (SOC) value of a battery and detects whether a signal indicating that the charging door is opened or closed is received, controls the projection lamp module to be turned on when the signal indicating that the charging door is opened is received, control the projection lamp module to project the light of the predetermined color onto the ground under the charging door based on the obtained information on the SOC value of the battery, and control the projection lamp module to be turned off when the signal indicating that the charging door is closed is received.

The controller may further detect whether a vehicle lock signal is received when the signal indicating that the charging door is opened is received, and control the projection lamp module to remain turned on when the vehicle lock signal is not detected.

The controller may further detect whether a smart key is located within a predetermined range when the vehicle lock signal is detected, and control the projection lamp module to be turned on when the smart key is detected within the predetermined range.

The controller may further detect whether a vehicle unlock signal is received from the smart key when the smart key is not detected within the predetermined range, control the projection lamp module to be turned on when the vehicle unlock signal is received from the smart key, and control the projection lamp module to be turned off after a predetermined time period is delayed when the vehicle unlock signal is not received from the smart key.

The information on the SOC value of the battery may include a plurality of predetermined SOC range values and charging failure information, and the light of the predetermined color, projected by the projection lamp module, may be set to correspond to each of the predetermined SOC range values and the charging failure information.

According to various exemplary embodiments of the present disclosure, a method of controlling projection of a charging door provided with a projection lamp is provided. Here, the charging door may include a base and a charging door panel, the base and the charging door panel may be connected to each other through a connection member, and the connection member may be mounted with a projection lamp module. The method includes: obtaining information on a state of charge (SOC) value of a battery and detecting whether a signal indicating that the charging door is opened or closed is received by a controller; turning on the projection lamp module of the charging door when the signal indicating that the charging door is opened is received to project light of a predetermined color to the ground under the charging door by the controller; and turning off the projection lamp module of the charging door when the signal indicating that the charging door is closed is received by the controller.

The charging door may further include a micro switch configured for detecting opening or closing of the charging door by being interlocked with the charging door panel, and the micro switch may be electrically connected to the controller to transmit the detected signal indicating that the charging door is opened or closed to the controller, the signal indicating that the charging door is opened may be received from the micro switch when the charging door panel is opened by the controller, and the signal indicating that the charging door is closed may be received from the micro switch when the charging door panel is closed by the controller.

It may be detected whether a vehicle lock signal is received when the signal indicating that the charging door is opened is received by the controller, and the projection lamp module may be turned on when the vehicle lock signal is not detected by the controller.

It may be detected whether the smart key is located within a predetermined range when the vehicle lock signal is detected by the controller, and the projection lamp module may be turned on when the smart key is detected within the predetermined range by the controller.

It may be detected whether a vehicle unlock signal is received from the smart key when the smart key is not detected within the predetermined range by the controller, the projection lamp module may be turned on when the vehicle unlock signal is received from the smart key by the controller, and the projection lamp module may be turned off after a predetermined time period is delayed when the vehicle unlock signal is not received from the smart key by the controller.

The information on the SOC value of the battery may include a plurality of predetermined SOC range values and charging failure information, and the light of the predetermined color which is projected by the projection lamp module may be set to correspond to each of the predetermined SOC range values and the charging failure information.

The present disclosure utilizes the above-described technical solutions, and may have the following advantageous effects.

The charging door of the present disclosure may have the function of a lighting lamp, and it may thus be convenient for the user to charge the vehicle at night or in dim light.

The charging door of the present disclosure may have the function of an indicator lamp, and the projection lamp may project various colors of light onto the ground based on the SOC value of the battery. Therefore, the user may easily and clearly understand the information on the current SOC from a distance through the color of light projected onto the ground, and does not necessarily have to stand in front of the charging door.

The charging door of the present disclosure may have the function of an interactive welcome light, and the projection lamp may be automatically turned on when the user holding the smart key returns around the vehicle, and the vehicle user may thus feel welcomed. Furthermore, the charging door of the present disclosure may more conform to ergonomics and may provide the user with the senses of interaction, advanced technology, and luxury by allowing the user to understand the SOC value of the battery at a glance.

Furthermore, the projection lamp of the present disclosure may be assembled to the connection member positioned between the charging door panel and the base, and thus may not occupy the internal space of the vehicle, in which the base is located, easily disposing the projection lamp module and the base.

Furthermore, an effect which may be obtained or predicted by the exemplary embodiments of the present disclosure is included directly or implicitly in the detailed description of the exemplary embodiments of the present disclosure. That is, various effects predicted by the exemplary embodiments of the present disclosure are included in the detailed description described below.

The methods and apparatuses of the present disclosure have other features and advantages which will be apparent

BRIEF DESCRIPTION OF THE DRAWINGS

FIG. 11 is a flowchart showing a method of controlling projection of a charging door provided with a projection lamp according to various exemplary embodiments of the present disclosure.

Figure 1:
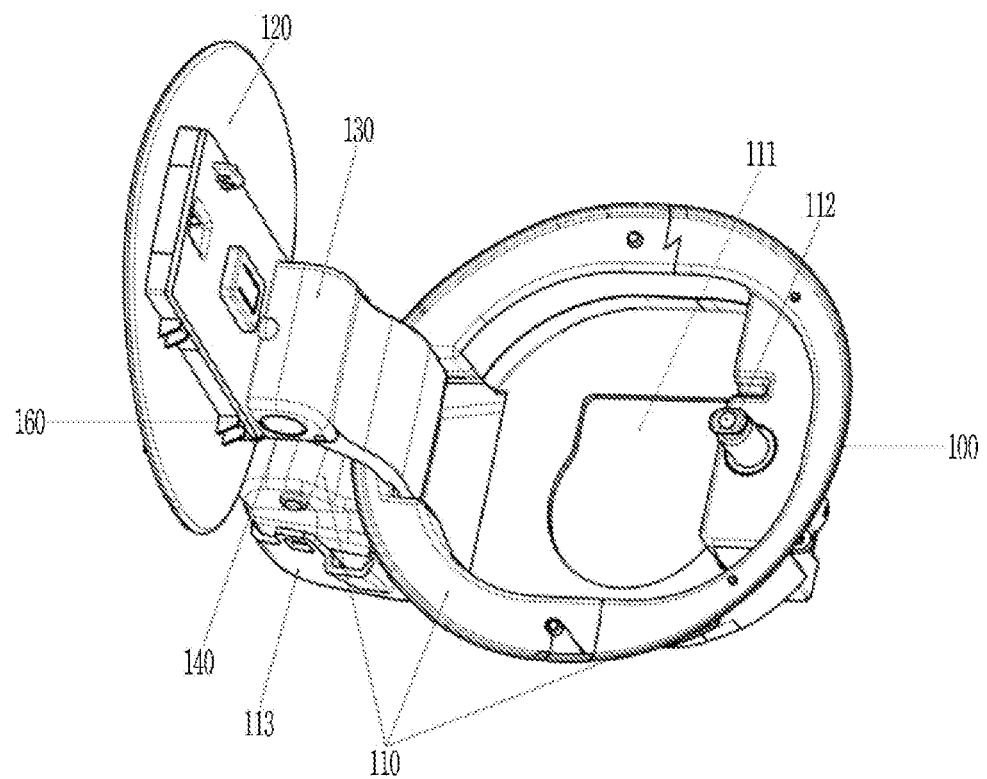
FIG. 1 is a structural schematic diagram showing a charging door provided with a projection lamp according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure are described in detail, and these embodiments are conducted under a premise of the technical solution of the present disclosure and show an implementation method and a specific operation process in detail. However, the scope of the present disclosure is not limited to the following embodiments.

FIG. 1 is a structural schematic diagram showing a charging door provided with a projection lamp according to various exemplary embodiments of the present disclosure.

As shown in FIG. 1, a charging door 100 may include a base 110, a charging door panel 120, a connection member 130, and a projection lamp module 140. A charging port 111 may be provided in the base 110, and a vehicle may be charged through the charging port 111. The charging door panel 120 is pivotably mounted to the base 110. The connection member 130 is configured to connect the base 110 and the charging door panel 120 with each other, and a mounting hole 160 is formed in the connection member 130. The projection lamp module 140 may be mounted in the mounting hole 160 of the connection member 130.

A push switch 112 may be further provided in the base 110, and the push switch 112 may control opening and closing of the charging door 100. Here, the method of controlling the opening and closing of the charging door 100 by use of the push switch 112 is only an example, and the present disclosure is not limited thereto.

Figure 2:
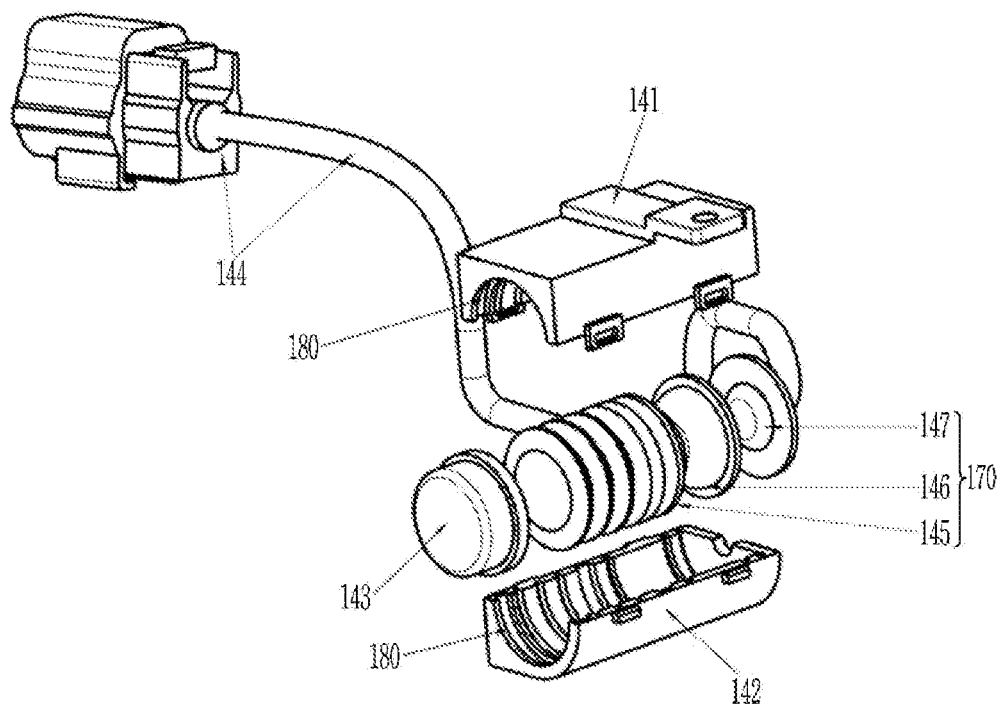
FIG. 2 is a structural exploded diagram showing a projection lamp module of a charging door provided with a projection lamp according to various exemplary embodiments of the present disclosure.
Figure 3A:
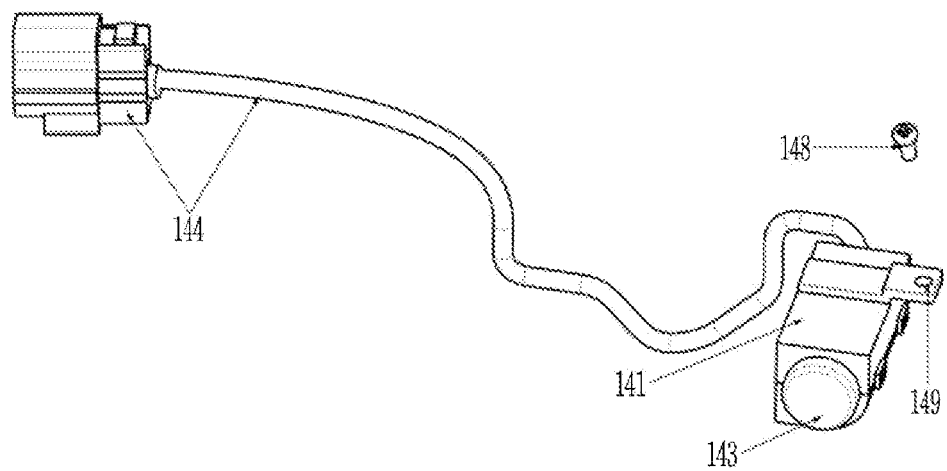
FIG. 3A and FIG. 3B are structural schematic diagrams each showing a projection lamp module of a charging door provided with a projection lamp according to various exemplary embodiments of the present disclosure.
Figure 3B:
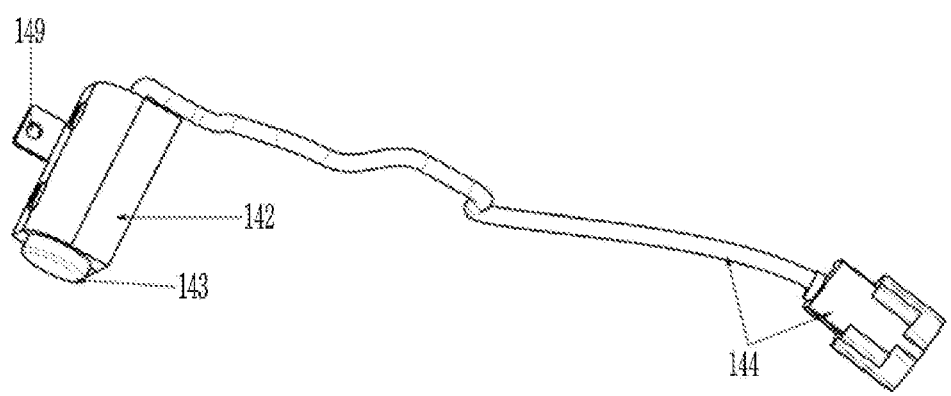

FIG. 2 is a structural exploded diagram showing the projection lamp module of the charging door provided with a projection lamp according to various exemplary embodiments of the present disclosure; and FIG. 3A and FIG. 3B are structural schematic diagrams each showing the projection lamp module of the charging door provided with a projection lamp according to various exemplary embodiments of the present disclosure.

Referring to FIGS. 2, 3A and 3B, the projection lamp module 140 may include an upper cover 141, a lower cover 142, a projection assembly 170, a transparent cover 143, and a wiring connector 144.

The upper cover 141 may be mounted with a fixing member fixing the projection lamp module 140 in the mounting hole 160 of the connection member 130. According to various exemplary embodiments of the present disclosure, the fixing member may include a screw 148, and a screw hole 149 matched with the screw 148 and formed in the upper cover 141. However, the present disclosure is not limited to the fixing member illustrated herein.

The lower cover 142 may oppose the upper cover 141 and have an accommodation space 180 formed between the lower cover 141 and the upper cover 141. The projection assembly 170 may be provided in the accommodation space 180 between the upper cover 141 and the lower cover 142, and include an optical assembly 145, a film sheet 146 and a light emitting assembly 147, integrated into one entity.

The light emitting assembly 147 may generate a light source. In detail, the light emitting assembly 147 may include a printed circuit board (PCB) on which the light source such as a light emitting diode or a laser is mounted. The film sheet 146 may have a pattern, and the optical assembly 145 may include optical lenses, and concentrate light emitted from the light source on the film sheet 146 or make the pattern on the film sheet 146 be enlarged by projecting light, etc. Therefore, in addition to being able to project light, the projection lamp module 140 may clearly project the pattern on the film sheet 146 to enrich a content projected by the projection lamp, satisfying various needs of a vehicle user.

The transparent cover 143 is configured to project light emitted from the projection assembly. Furthermore, the transparent cover 143 may have dustproof, waterproof and anti-pollution functions, and thus protect the projection assembly 170 of the projection lamp module 140.

The wiring connector 144 is electrically connect the projection lamp module 140 to a controller 200 of the vehicle (see FIG. 9), and the projection lamp module 140 may thus receive a command signal from the controller 200 to be turned on or off and project light of various colors, based on the command signal of the controller 200.

Figure 4:
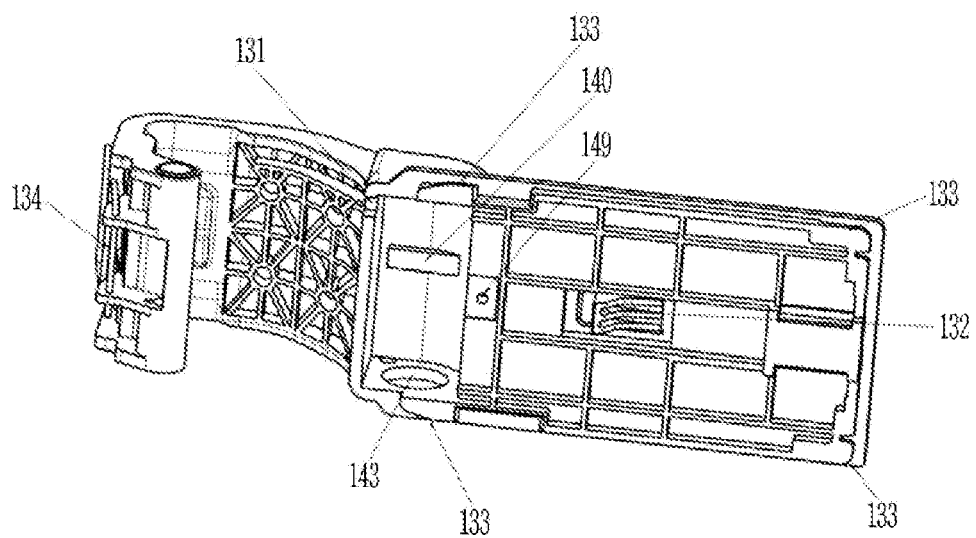
FIG. 4 is a structural schematic diagram showing that a connection member of a charging door provided with a projection lamp according to the exemplary embodiment of the present disclosure and the projection lamp module are assembled with each other.

FIG. 4 is a structural schematic diagram showing the connection member of the charging door provided with a projection lamp according to the exemplary embodiment of the present disclosure.

Referring to FIG. 2, FIG. 3 and FIG. 4, the mounting hole in which the projection lamp module 140 is mounted may be formed in the connection member 130 of the charging door provided with a projection lamp. A mounting step of mounting the projection lamp module 140 in the mounting hole 160 of the connection member 130 may include mounting the transparent cover 143 of the projection lamp module 140 in the mounting hole 160 of the connection member 130, allowing the lower cover 142 of the projection lamp module 140 to come into contact with an assembly surface of the connection member 130, fixing the projection lamp module 140 into the connection member 130 by passing the screw 148 through the screw hole 149 in the upper cover 141, and allowing the wiring connector 144 of the projection lamp module 140 to come out of a through hole 131 of the connection member 130.

An elastic member 134 may be provided at one end portion of the connection member 130 which is connected to the base 110 of the charging door 100. After the projection lamp module 140 is mounted in the mounting hole 160 of the connection member 130, the connection member 130 may be connected to the base 110. For example, the connection member 130 may be connected to the base 110 through the elastic member 134. The connection member 130 may include a gooseneck hinge. However, the present disclosure is not limited thereto.

Figure 5:
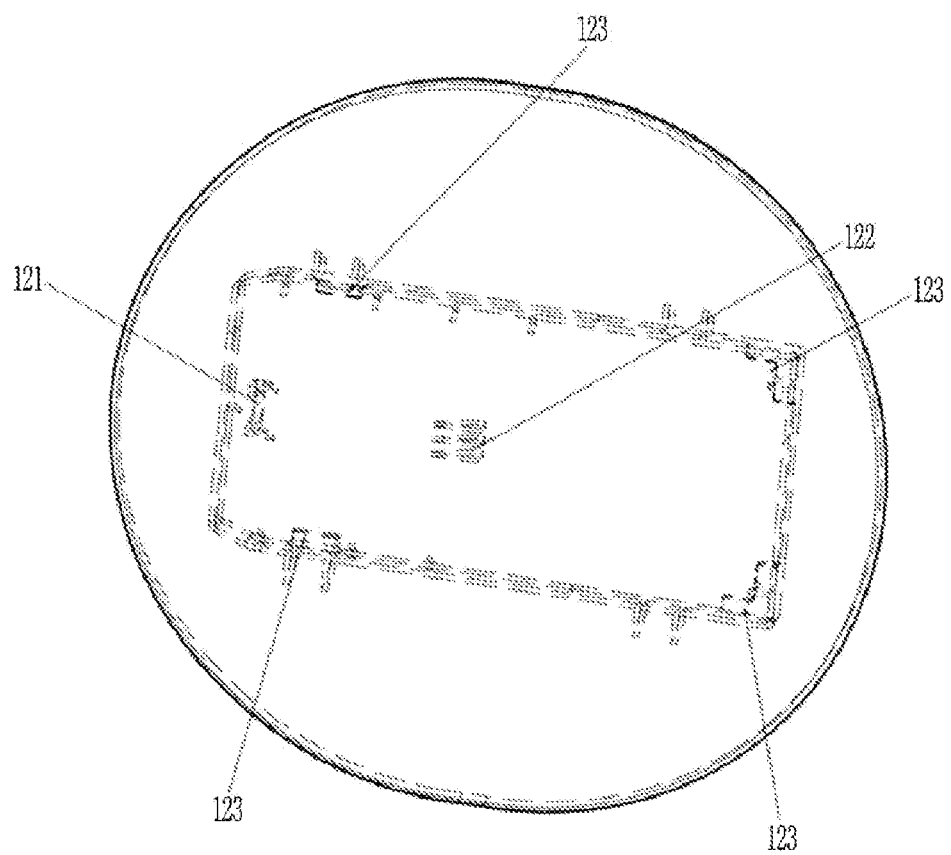
FIG. 5 is a structural schematic diagram showing a charging door panel of a charging door provided with a projection lamp according to various exemplary embodiments of the present disclosure.
Figure 6:
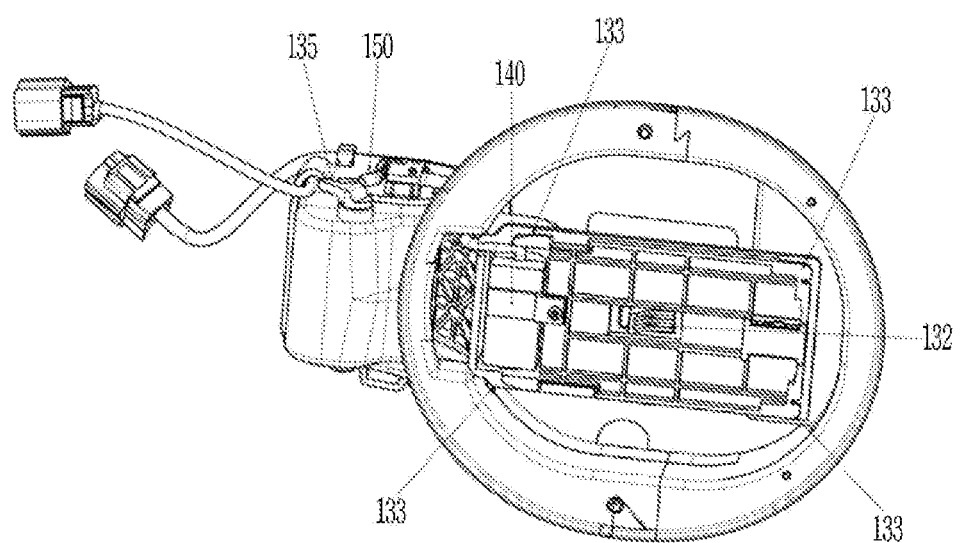
FIG. 6 is a structural schematic diagram showing a connection member mounted to a charging door panel shown in FIG. 5.

FIG. 5 is a structural schematic diagram showing the charging door panel of the charging door provided with a projection lamp according to various exemplary embodiments of the present disclosure; and FIG. 6 is a structural schematic diagram showing the connection member mounted to the charging door panel shown in FIG. 5.

As shown in FIG. 5, the charging door panel 120 may be mounted with a projection lamp module position-limit rib 121, a charging door panel-connection rib 122 and a charging door panel hook 123. The projection lamp module position-limit rib 121 may limit a position of the projection lamp module 140, and the charging door panel-connection rib 122 and the charging door panel hook 123 may limit a position of the connection member 130. As shown in FIG. 6, the connection member 130 may be mounted with a connection hook 132 and a guide member 133. Here, the connection hook 132 and the charging door panel connection rib 122 may be matched with each other, and the guide member 133 and the charging door panel hook 123 may be matched with each other.

After the projection lamp module 140 is mounted in the mounting hole 160 of the connection member 110 and the connection member 130 is connected to the base 110, the charging door panel 120 is mounted to the connection member 130. In detail, referring to FIG. 5 and FIG. 6, the charging door panel 120 may slide along the guide member 133 of the connection member 130 until the charging door panel-connection rib 122 on the charging door panel 120 is connected to the connection hook 132 on the connection member 130. Here, the projection lamp module position-limit rib 121 may also limit the position of the projection lamp module 140.

This connection method between the charging door panel 120 and the connection member 130 may allow both the components to be securely mounted to each other. Simultaneously, the position of the projection lamp module 140 may also be limited using the projection lamp module position-limit rib 121 on the charging door panel 120.

Figure 7:
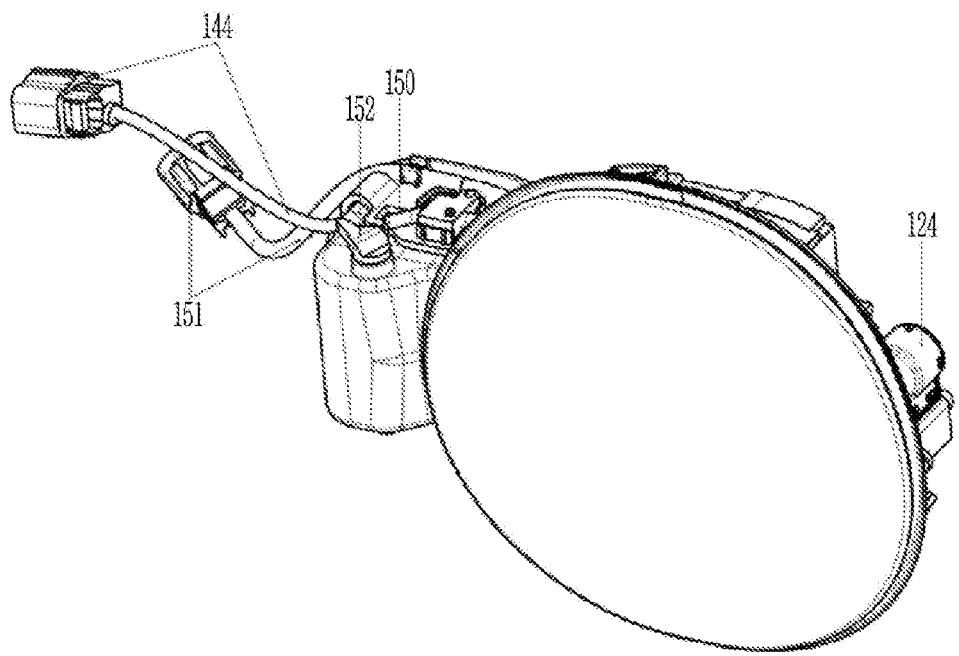
FIG. 7 is a structural schematic diagram showing a micro switch of a charging door provided with a projection lamp according to various exemplary embodiments of the present disclosure.
Figure 8:
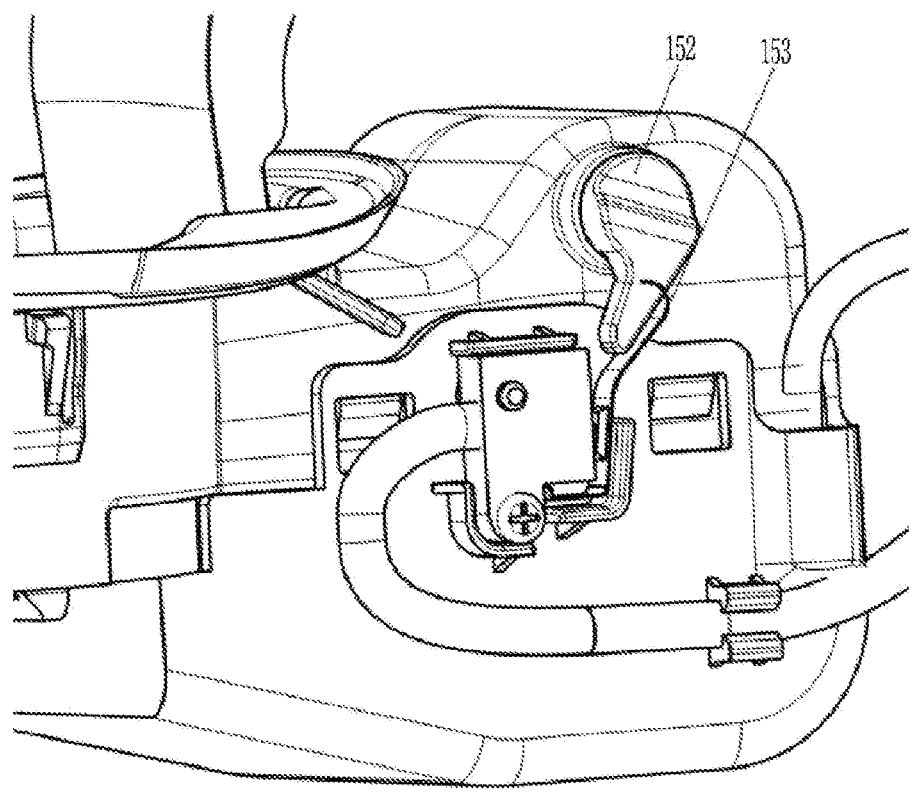
FIG. 8 is a structural schematic diagram showing a micro switch of a charging door provided with a projection lamp according to various exemplary embodiments of the present disclosure in a state where a charging door panel is fully opened.

FIG. 7 is a structural schematic diagram showing a micro switch of the charging door provided with a projection lamp according to various exemplary embodiments of the present disclosure; and FIG. 8 is a structural schematic diagram showing the micro switch of the charging door provided with a projection lamp according to various exemplary embodiments of the present disclosure in a state where the charging door panel is fully opened.

As shown in FIG. 7, a lock hole 124 corresponding to the push switch 112 may be formed on the charging door panel 120. Connection between the lock hole 124 and the push switch 112 may be released when a vehicle user applies a certain pressing force to a position of the charging door panel 120, corresponding to the push switch 112. Here, the charging door panel 120 may be opened at a certain angle (for example, the charging door panel 120 may form an angle of about 15 degrees with the base 110). The vehicle user may then fully open the charging door panel 120 (for example, the charging door panel 120 may form an angle of 90 degrees with the base 110). Here, the angles are only examples, and the present disclosure is not limited thereto.

Referring to FIGS. 7 and 8, the charging door 100 provided with a projection lamp according to various exemplary embodiments of the present disclosure may further include a micro switch 150. The micro switch 150 may be provided in a lower shell 113 of the base 110. The micro switch 150 may detect the opening or the closing of the charging door by being interlocked with the charging door panel 120.

In an exemplary embodiment of the present disclosure, the charging door panel 120 may be opened by the certain angle when the vehicle user applies the certain pressing force to the position of the charging door panel 120 corresponding to the push switch 112, and the vehicle user may then fully open the charging door panel 120 manually. FIG. 8 shows a state where the charging door panel 120 is fully opened.

In the state where the charging door panel 120 is fully opened, a lead 153 of the micro switch 150 may be pressed so that the lead 153 is brought into contact with a hinge pin 152 and a signal indicating that the charging door is opened may be transmitted to the controller 200 through a micro switch wiring connector 151. In a state where the charging door panel 120 is closed, the lead 153 of the micro switch 150 may be separated from the hinge pin 512, and a signal indicating that the charging door is closed may be transmitted to the controller 200 through the micro switch wiring connector 151. In the present way, the opening or the closing of the charging door 100 may be detected using the micro switch 150.

Figure 9:
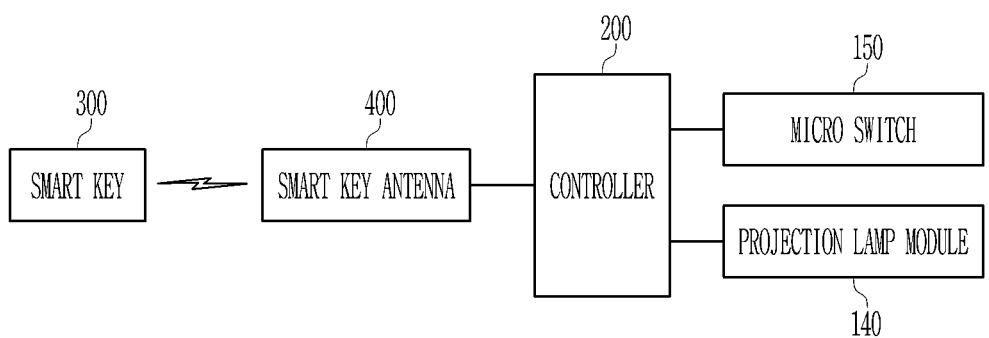
FIG. 9 is a structural block diagram showing a projection control system of a charging door provided with a projection lamp according to various exemplary embodiments of the present disclosure.

FIG. 9 is a structural block diagram showing a projection control system of the charging door provided with a projection lamp according to various exemplary embodiments of the present disclosure.

As shown in FIG. 9, the projection control system of the charging door provided with a projection lamp according to various exemplary embodiments of the present disclosure may include the projection lamp module 140, the micro switch 150, the controller 200, a smart key 300, and a smart key antenna 400.

The projection lamp module 140 may be electrically connected to the controller 200, be turned on or off, and project light of the various colors, based on the command signal of the controller 200.

The micro switch 150 may be electrically connected to the controller 200, and transmit the detected signal indicating that the charging door is opened or is closed to the controller 200. The micro switch 150 may transmit the signal indicating that the charging door is opened to the controller 200 when the charging door panel 120 is opened, and the micro switch 150 may transmit the signal indicating that the charging door is closed to the controller 200 when the charging door panel 120 is closed.

The micro switch 150 may include the micro switch-wiring connector 151, and the projection lamp module 140 may include the wiring connector 144. Accordingly, the micro switch 150 may be electrically connected to the controller 200 through the micro switch-wiring connector 151, and the projection lamp module 140 may be electrically connected to the controller 200 through the wiring connector 144. Communication between the micro switch 150 and the controller 200 and communication between the projection lamp module 140 and the controller 200 may be performed using a Local Interconnect Network (LIN) bus. However, the communication method is not limited to the LIN bus communication method. Communication between the smart key antenna 400 and the controller 200 may be performed using a controller area network (CAN) bus. However, the communication method is not limited to the CAN bus communication method.

The controller 200 may obtain information on a state of charge (SOC) value of a battery and detect whether the signal indicating that the charging door 100 is opened or closed is received. The controller 200 may control the projection lamp module 140 to be turned on when the signal indicating that the charging door 100 is opened is received, and control the projection lamp module 140 to project light of the various colors onto the ground under the charging door 100 based on the obtained information on the SOC value of the battery. The controller 200 may control the projection lamp module 140 to be turned off when the signal indicating that the charging door 100 is closed is received. In an implementation, the controller 200 may include one or more of a body control module (BCM), a central control processor, and an audio video navigation telecommunication (AVNT) smart connect device.

In various exemplary embodiments of the present disclosure, the charging door panel 120 may be opened by the certain angle and pivoted until fully opened when the vehicle user applies the certain pressing force to the position of the charging door panel 120 corresponding to the push switch 112. The charging door 100 may be closed when the charging door panel 120 is closed, that is, pivoted toward the base 110. The charging door 100 of the vehicle may be opened or closed by the connection member 130 connected between the base 110 and the charging door panel 120 and capable of pivoting the charging door panel 120 relative to the base 110. The projection lamp module 140 may be mounted in the mounting hole 160 of the connection member 130 and thus, may not occupy an internal space of the vehicle where the base 110 of the charging door 100 is located, saving the internal space of the vehicle and simultaneously, easily disposing the projection lamp module 140 and the base 110 of the charging door 100. The projection lamp module 140 may be turned on or off under control of the controller 200 to project the light of the various colors. For example, the projection lamp module 140 may directly project light onto the ground and function as a lighting lamp, and it may thus be convenient for the user to charge the vehicle at night or in dim light. Furthermore, the light of the various colors may indicate the information on the SOC value of the battery to function as an indicator light. Therefore, the user may easily and clearly understand the information on a current SOC from a distance through a color of the light projected onto the ground, and does not necessarily have to stand in front of the charging door 100.

Furthermore, the projection lamp module 140 may be turned on when the charging door panel 120 is opened, and the projection lamp module 140 may be turned off when the charging door panel 120 is closed. Therefore, the projection lamp module 140 may be prevented from being still operated when the vehicle is not charged, saving power of the battery.

Furthermore, the smart key 300 and the controller 200 may wirelessly communicate with each other through the smart key antenna 400. The smart key 300 may transmit a vehicle lock signal or a vehicle unlock signal to the controller 200, and its location may be tracked under control of the controller 200. The controller 200 may detect the vehicle lock signal or the vehicle unlock signal transmitted by the smart key 300, and detect whether the smart key 300 is located within a predetermined range.

In detail, the controller 200 may further detect whether the vehicle lock signal is received from the smart key 300 when the signal indicating that the charging door 100 is opened is received. The controller 200 may control the projection lamp module 140 to remain turned on when the vehicle lock signal is not detected. That is, the projection lamp may be turned on when the charging door 100 is opened and the vehicle is unlocked.

The controller 200 may further detect whether the smart key 300 is located within the predetermined range and further detect whether the smart key 300 transmits the vehicle unlock signal, when the controller 200 detects the vehicle lock signal.

In detail, the controller 200 may detect whether the smart key 300 is located within the predetermined range when the vehicle lock signal is detected. The controller 200 may control the projection lamp module 140 to remain turned on when the smart key 300 is detected within the predetermined range. The controller 200 may detect whether the vehicle unlock signal is received when the smart key 300 is not detected within the predetermined range. The controller 200 may control the projection lamp module 140 to remain turned on when the vehicle unlock signal is received. The controller 200 may control the projection lamp module 140 to be turned off after a predetermined time period is delayed when the vehicle unlock signal is not received. Here, the predetermined time period may be set to 1 minute, 2 minutes or the like, and the predetermined range may be set to 1.5 meters, 2 meters or the like. However, the present disclosure is not limited thereto.

That is, it may indicate that the vehicle user holding the smart key 300 is around the vehicle when it is detected by the controller 200 that the smart key 300 is located within the predetermined range while the charging door 100 is opened and the vehicle is locked, and the projection lamp module 140 may thus be turned on. It may indicate that the vehicle user is about to use the vehicle soon when the vehicle unlock signal is received by the controller 200, and the projection lamp module 140 may thus be turned on to welcome the vehicle user. Various exemplary embodiments of the present disclosure may have a function of interacting with the vehicle user to implement an interactive welcome to the user, and the vehicle user may thus feel welcomed and easily and clearly understand the SOC value of the battery.

Figure 10:
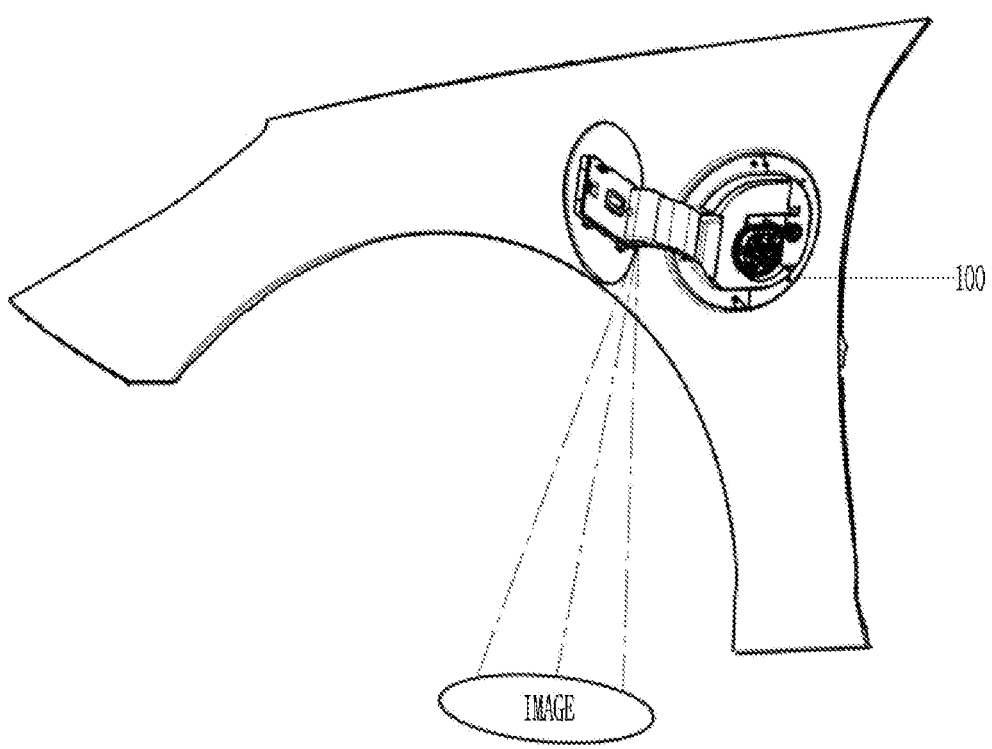
FIG. 10 is a diagram showing an effect of using a charging door provided with a projection lamp according to an exemplary embodiment of the present disclosure.

FIG. 10 is a diagram showing an effect of using the charging door provided with a projection lamp according to an exemplary embodiment of the present disclosure. As shown in FIG. 10, the projection lamp module 140 may be located in the connection member 130 positioned outside a vehicle body while the charging door 100 is opened, and the projection lamp module 140 may project the light of the various colors onto the ground under the charging door based on the obtained information on the SOC value of the battery.

In an exemplary embodiment of the present disclosure, the information on the SOC value of the battery may include a plurality of predetermined SOC range values and charging failure information. The light of the various colors, projected by the projection lamp module 140, may each be set to correspond to the plurality of predetermined SOC range values and the charging failure information. For example, the projection lamp module 140 may project the light of the various colors, each including a warning or a caution when the SOC value of the battery is within an arbitrary predetermined range or a charging failure occurs. In detail, the projection lamp module may project red light when the SOC value of the battery is within a range of 50%, the projection lamp module may project green light when the SOC value of the battery is within a range of 51% to 99%, the projection lamp module may project blue light when the battery is fully charged, that is, when the SOC is 100%, and the projection lamp module may project yellow light when the charging failure occurs. The SOCs of the battery and the corresponding luminescent colors are only examples, and the present disclosure is not limited thereto.

FIG. 11 is a flowchart showing a method of controlling projection of a charging door provided with a projection lamp according to various exemplary embodiments of the present disclosure. The charging door 100 may include the base 110 and the charging door panel 120, the base 110 and the charging door panel 120 may be connected to each other through the connection member 130, and the connection member 130 may be mounted with the projection lamp module 140. The charging door 100 may further include the micro switch 150, and the micro switch 150 may be interlocked with the charging door panel 120.

The method of controlling the projection may include the following steps.

The information on the SOC value of the battery may be obtained at step S11, and it may be detected whether the charging door is opened at step S12 by the controller 200.

The controller 200 may include one or more of a body control module (BCM), a central control processor, and an audio video navigation telecommunication (AVNT) smart connect device.

The micro switch 150 may detect the opening or the closing of the charging door by being interlocked with the charging door panel 120. In detail, the charging door panel 120 may be opened when the vehicle user applies the certain pressing force to the push switch 112, and the vehicle user may then fully open the charging door panel 120 manually. In the state where the charging door panel 120 is fully opened, the lead 153 of the micro switch 150 may be brought into contact with the hinge pin 152, and the micro switch 150 of the lead 153 may be separated from the hinge pin 152 when the vehicle user manually closes the charging door panel 120. In the present way, the opening or the closing of the charging door 100 may be detected by interlocking the micro switch 150 and the charging door panel 120 with each other.

The micro switch 150 may transmit the signal indicating that the charging door is closed to the controller 200 when the charging door panel 120 is closed. The projection lamp module 140 of the charging door 100 may be turned off at step S14 when the signal indicating that the charging door is closed is received by the controller 200, that is, when it is confirmed that the charging door is closed.

The micro switch 150 may transmit the signal indicating that the charging door 100 is opened to the controller 200 when the charging door panel 120 is opened. The projection lamp module 140 may be turned on at step S13 and it may be further detected whether the vehicle lock signal is received at step S15, when the signal indicating that the charging door is opened is received by the controller 200, that is, when it is confirmed that the charging door is opened.

The projection lamp module 140 may remain turned on at the step S13 when the vehicle lock signal is not detected by the controller 200. It may be further detected whether the smart key 300 is located within the predetermined range at step S16 when the vehicle lock signal is detected by the controller 200. The projection lamp module 140 may remain turned on at the step S13 when the smart key 300 is detected within the predetermined range by the controller 200. It may be further detected whether the vehicle unlock signal is received at step S17 when the smart key 300 is not detected within the predetermined range by the controller 200.

The projection lamp module 140 may remain turned on at the step S13 when the vehicle unlock signal is received by the controller 200, and the projection lamp module 140 may be turned off at step S18 after the predetermined time period is delay when the vehicle unlock signal is not received by the controller 200. Here, predetermined time period may be set to 1 minute, 2 minutes or the like, and the predetermined range may be set to 1.5 meters, 2 meters or the like. However, the present disclosure is not limited thereto.

According to various exemplary embodiments of the present disclosure, the projection lamp module 140 may be turned off after the predetermined time period to save power when the smart key 300 is not detected and the vehicle unlock signal is not received by the controller 200 in a state where the charging door is opened and the vehicle is locked. For example, the projection lamp module 140 may be turned off after 1 minute when the smart key 300 is not detected and the vehicle unlock signal is not received by the controller 200. Furthermore, the controller 200 may determine that the vehicle user holding the smart key 300 is around the vehicle and turn on the projection lamp module 140 to welcome the vehicle user, when the smart key 300 is detected around the vehicle in the state where the charging door is opened and the vehicle is locked. That is, a various exemplary embodiments of the present disclosure may have a function of interacting with the vehicle user to implement an interactive welcome to the user, and the vehicle user may thus feel welcomed and easily and clearly understand the SOC value of the battery.

The controller 200 may further determine that the user is about to use the vehicle soon and thus turn on the projection lamp module 140 to welcome the vehicle user when the vehicle unlock signal is received by the controller 200 in the state where the charging door is opened and the vehicle is locked. That is, a various exemplary embodiments of the present disclosure may have the function of interacting with the vehicle user to implement the interactive welcome to the user, and the vehicle user may thus feel welcomed and easily and clearly understand the SOC value of the battery.

In various exemplary embodiments of the present disclosure, the controller 200 may control the projection lamp module 140 to project the light of the various colors onto the ground, and the projection lamp may function as a lighting lamp, when the projection lamp module 140 is turned on. Therefore, it may be convenient for the user to charge the vehicle at night or in dim light. Furthermore, the various colors projected by the projection lamp module 140 may indicate the information on the SOC value of the battery, thus functioning as an indicator light. Accordingly, the user may easily and clearly understand the information on the current SOC from a distance through the color of the light projected onto the ground, and does not necessarily may stand in front of the charging door 100. Furthermore, the projection lamp module 140 may be turned off when the charging door panel 120 is closed, which may prevent the projection lamp module 140 from being still operated when the vehicle is not charged, saving the power of the battery.

In various exemplary embodiments of the present disclosure, the information on the SOC value of the battery may include the plurality of predetermined SOC range values and the charging failure information. The light of the various colors projected by the projection lamp module 140 may each be set to correspond to the plurality of predetermined SOC range values and the charging failure information. For example, the projection lamp module 140 may project the light of the various colors, each having a warning or a caution when the SOC value of the battery is within the arbitrary predetermined range or the charging failure occurs. In detail, the projection lamp module may project the red light when the SOC value of the battery is within the range of 50%, the projection lamp module may project the green light when the SOC value of the battery is within the range of 51% to 99%, the projection lamp module may project the blue light when the battery is fully charged, that is, when the SOC is 100%, and the projection lamp module may project the yellow light when the charging failure occurs. The SOCs of the battery and the corresponding luminescent colors are only examples, and the present disclosure is not limited thereto.

Hereinafter, the description takes a specific example to describe an operation process of the method of controlling projection of a charging door provided with a projection lamp according to various exemplary embodiments of the present disclosure will be described by way of a specific example.

The vehicle user may manually press the charging door when the vehicle user wants to charge the vehicle. In the instant case, the charging door 100 may be opened by the predetermined angle, and the vehicle user may then fully open the charging door 100 manually. The micro switch 150 may be interlocked with the charging door 100 to transmit the signal indicating that the charging door is opened to the controller 200. The controller 200 may control the projection lamp module 140 to be turned on when the signal indicating that the charging door 100 is opened is received by the controller 200, and to project the light of the various colors onto the ground under the charging door 100 based on the obtained information on the SOC value of the battery. Therefore, it may be convenient for the user to charge the vehicle at night or in dim light. Furthermore, the light of the various colors projected by the projection lamp module 140 may indicate the information on the SOC value of the battery. Therefore, the user may easily and clearly understand the information on the current SOC from a distance through the color of the light projected onto the ground, and does not necessarily may stand in front of the charging door.

The projection lamp module 140 may be turned on when the user holding the smart key 300 is around the vehicle or unlocks the vehicle by use of the smart key 300 in a state where the charging door 100 is opened and the vehicle is locked. Therefore, the vehicle user may feel welcomed, understand the SOC value of the battery at a glance, and recognize implemented senses of interaction, advanced technology, and luxury. The projection lamp module 140 may also be turned off when the user manually closes the charging door 100 after the vehicle is fully charged.

The various embodiments of the present disclosure are not an exhaustive list of all possible combinations, and are intended to illustrate representative aspects of the present disclosure. Therefore, the teachings of the various embodiments may thus be applied independently from each other or in combination of two or more.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A charging door provided with a projection lamp, the charging door comprising:
    a base, a charging door panel, a connection member, and a projection lamp module,
    wherein a charging port is formed in the base, and a vehicle is charged through the charging port,
    wherein the charging door panel is pivotably mounted to the base,
    wherein the connection member connects the base and the charging door panel with each other, and a mounting hole is formed in the connection member, and
    wherein the projection lamp module is mounted in the mounting hole of the connection member, the projection lamp module is electrically connected to a controller to be turned on or off according to a command signal of the controller and to project light of a predetermined color based on the command signal of the controller.

2. The charging door of claim 1, wherein the projection lamp module includes:
    an upper cover mounted with a fixing member fixing the projection lamp module in the mounting hole of the connection member;
    a lower cover opposing the upper cover and including an accommodation space formed between the upper cover and the lower cover;
    a projection assembly provided in the accommodation space between the upper cover and the lower cover, and including an optical assembly, a film sheet, and a light emitting assembly integrated to each other;
    a transparent cover projecting light emitted from the projection assembly; and
    a wiring connector electrically connecting the projection lamp module to the controller.

3. The charging door of claim 2,
    wherein the charging door panel is mounted with a charging door panel-connection rib,
    wherein the connection member is mounted with a connection hook matched with the charging door panel-connection rib, and
    wherein the charging door panel slides along a guide member of the connection member until the charging door panel-connection rib on the charging door panel is connected to the connection hook on the connection member after the projection lamp module is mounted in the mounting hole of the connection member.

4. The charging door of claim 1, further including:
    a micro switch configured for detecting opening or closing of the charging door by being interlocked with the charging door panel,
    wherein the micro switch is electrically connected to the controller to transmit a detected signal indicating that the charging door is opened or closed to the controller,
    wherein the micro switch is configured to transmit the signal indicating that the charging door is opened to the controller when the charging door panel is opened, and
    wherein the micro switch is configured to transmit the signal indicating that the charging door is closed to the controller when the charging door panel is closed.

5. The charging door of claim 1, wherein the controller is configured to obtain information on a state of charge (SOC) value of a battery and to detect whether a signal indicating that the charging door is opened or closed is received, and configured to control the projection lamp module to be turned on when the signal indicating that the charging door is opened is received, to control the projection lamp module to project the light of the predetermined color onto the ground under the charging door based on the obtained information on the SOC value of the battery, and to control the projection lamp module to be turned off when the signal indicating that the charging door is closed is received.

6. The charging door of claim 5, wherein the controller is further configured to detect whether a vehicle lock signal is received when the signal indicating that the charging door is opened is received, and to control the projection lamp module to remain turned on when the vehicle lock signal is not detected.

7. The charging door of claim 6, wherein the controller is further configured to detect whether a smart key is located within a predetermined range when the vehicle lock signal is detected, and to control the projection lamp module to be turned on when the smart key is detected within the predetermined range.

8. The charging door of claim 7, wherein the controller is further configured to detect whether the vehicle unlock signal is received from the smart key when the smart key is not detected within the predetermined range, to control the projection lamp module to be turned on when the vehicle unlock signal is received from the smart key, and to control the projection lamp module to be turned off after a predetermined time period is delayed when the vehicle unlock signal is not received from the smart key.

9. The charging door of claim 5,
wherein the information on the SOC value of the battery includes a plurality of predetermined SOC range values and charging failure information, and
wherein the light of the predetermined color, projected by the projection lamp module, is set to correspond to each of the predetermined SOC range values and the charging failure information.

10. A method of controlling projection of a charging door provided with a projection lamp, in which the charging door includes a base and a charging door panel, the base and the charging door panel are connected to each other through a connection member, and the connection member is mounted with a projection lamp module, the method including:
obtaining, by a controller, information on a state of charge (SOC) value of a battery and detecting whether a signal indicating that the charging door is opened or closed is received;
turning on, by the controller, the projection lamp module of the charging door when the signal indicating that the charging door is opened is received to project light of a predetermined color to the ground under the charging door; and
turning off, by the controller, the projection lamp module of the charging door when the signal indicating the charging door is closed is received.

11. The method of claim 10,
wherein the charging door further includes a micro switch configured for detecting opening or closing of the charging door by being interlocked with the charging door panel, and the micro switch is electrically connected to the controller to transmit the detected signal indicating that the charging door is opened or closed to the controller,
wherein the signal indicating that the charging door is opened is received by the controller from the micro switch when the charging door panel is opened, and
wherein the signal indicating that the charging door is closed is received by the controller from the micro switch when the charging door panel is closed.

12. The method of claim 11,
wherein the controller is configured to detect whether a vehicle lock signal is received when the signal indicating that the charging door is opened is received, and
wherein the controller is configured to turn on the projection lamp module when the vehicle lock signal is not detected by the controller.

13. The method of claim 11,
wherein the controller is configured to determine whether a smart key is located within a predetermined range when the vehicle lock signal is detected by the controller, and
wherein the controller is configured to turn on the projection lamp module when the smart key is detected within the predetermined range by the controller.

14. The method of claim 13,
wherein the controller is configured to determine whether a vehicle unlock signal is received from the smart key when the smart key is not detected within the predetermined range,
wherein the controller is configured to turn on the projection lamp module when the vehicle unlock signal is received from the smart key by the controller, and
wherein the controller is configured to turn off the projection lamp module after a predetermined time period is delayed when the vehicle unlock signal is not received from the smart key by the controller.

15. The method of claim 10,
wherein the information on the SOC value of the battery includes a plurality of predetermined SOC range values and charging failure information, and
wherein the light of the predetermined color which is projected by the projection lamp module is set to correspond to each of the predetermined SOC range values and the charging failure information.

* * * * *